United States Patent [19]

Dawson et al.

[11] 4,210,680
[45] Jul. 1, 1980

[54] APPARATUS AND A PROCESS FOR TREATING WASTE

[75] Inventors: Gaynor W. Dawson, Richland; Hugh C. Leiper, Enumclaw; Arthur T. Brix, Konwenits, all of Wash.

[73] Assignee: Herds, Inc., Enumclaw, Wash.

[21] Appl. No.: 323,886

[22] Filed: Jan. 15, 1973

[51] Int. Cl.$^2$ .............................................. A23K 1/00
[52] U.S. Cl. .................................... 426/641; 426/807
[58] Field of Search ................ 71/21, 22, 15; 210/59, 210/60, 64, 615; 426/373, 374, 364, 377, 382, 210, 335, 321, 407, 626, 635, 636, 641, 646, 657, 807

[56] References Cited

U.S. PATENT DOCUMENTS

| | | | |
|---|---|---|---|
| 1,071,218 | 8/1913 | Dyck | 426/212 |
| 1,810,239 | 6/1931 | Doolittle | 71/21 |
| 3,050,383 | 8/1962 | Wilson | 71/21 |
| 3,292,584 | 12/1966 | Brodrick | 426/244 |
| 3,767,416 | 10/1973 | Lee | 260/112 |
| 4,078,094 | 3/1978 | Katzen | 426/641 |

FOREIGN PATENT DOCUMENTS 51-10078  1/1976  Japan ............................................. 71/21

OTHER PUBLICATIONS

Morrison—Feeds and Feeding, Ithaca, N.Y., Merriam Pub. Co., 1957, pp. 101, 105–107, 535.

*Primary Examiner*—Hiram H. Bernstein

[57] ABSTRACT

This invention is directed to a process and to apparatus, and has a two-fold purpose for decreasing pollution due to waste and also for converting the waste into an animal feed for cattle, sheep, hogs and fowl such as chickens. The waste, comprising manure, is treated so as to be converted into a feed which can be fed to a bos thereby being recycled so as to lessen pollution from a bos. Also, cellulose based materials may be processed according to these teachings to make an animal feed.

21 Claims, 5 Drawing Figures

APPARATUS AND A PROCESS FOR TREATING WASTE

BACKGROUND OF THE INVENTION

As is well known, at the present time, there are feedlots for feeding cattle. These feedlots vary in size and have various concentration of cattle or bos. For example, a farmer may have his own small feedlot and feed 25 head of cattle at a time. The farmer produces the majority, if not all, of the feed for the cattle. The cattle droppings can be spread on the farmer's land to help enrich the soil.

As the size of the feedlot increases, the disposal problems of the droppings, manure and the like, increase. At a certain size, the man or operator with the feedlot, ceases to raise his own feed but purchases all of the feed for the cattle. The problem of raising the feed for the cattle has been solved but the problem of disposing of the droppings and manure have not been solved and remains with the operator of the feedlot. In almost all instances, the operator of the feedlot will own only enough land to allow the cattle to eat, walk around and lay down. The operator of the feedlot will not own enough land to spread the droppings and the manure. In time, there is a build up of manure and it becomes necessary to move these accumulated wastes. For example, a bulldozer may be called in and the manure bulldozed into a large pile or mound in the pen. The cattle will lie on these large piles of manure. Even though there results large piles of manure, at some time it is necessary to dispose of the manure so as to have a place for the cattle to feed. An example of such a problem is a feedlot in Colorado having between 100,000 and 130,000 cattle. It is our understanding that the farmers in the vicinity of this feedlot bring in a truckload of silage and must accept two truckloads of manure for every truckload of silage. The manure is hauled from the feedlot and spread on the land of the farmers. This feedlot disposes of the manure by spreading it on the land of the suppliers of the silage.

In another feedlot we have visited, there is the facility for handling, approximately, 40,000 cattle at one time. One of the ranchers in fairly close proximity to this feedlot considered hauling the manure. Upon calculating the amount of manure to be spread upon his property, the calculation showed that in one year the depth of the manure would be approximately five feet (5') thick on this rancher's property. The soil is not capable of handling this quantity of manure. In Western Washington, it is estimated that the soil can handle one and one-half (1½) cattle per acre without any problems. With an increase of the number of cattle per acre, the problems increase for the handling of the manure and the droppings.

Some feedlots are located near rivers. For example, in the Mid-West many of the feedlots are located near a river. When it rains, or there are flood conditions, or a spring thaw, the manure and droppings in the feedlot wash into the river and form an aqueous suspension in the river. As a result, there are contaminants in the river. The biological oxygen demand (BOD) of the river increases with a resultant decrease in the fish in the river. Furthermore, the towns downstream from the feedlot quite often take their domestic and industrial water from the river. However, at these downstream towns, the river is contaminated with manure and droppings from the bos or the cattle. Because of this contamination, it is necessary to more extensively treat the water in the river with a purification agent such as chlorine and to more extensively filter the treated water to make it suitable for domestic and industrial use. Also, because of the association of the domestic and industrial water with the manure in suspension, many of the townspeople object to drinking and using the water even though the bacteria count is sufficiently low so as not to introduce a disease or a sickness to the townspeople.

The manure and droppings from the cattle pose another pollution problem in that the ammonia from the urine and feces introduce pollution of ground and surface waters when the ammonia is oxidized to nitrates.

The disposal of the manure and droppings from a feedlot is a big problem. It is necessary to handle the solids. Generally, the solids must be transported a considerable distance and then spread on sufficient land so as to be absorbed and processed by the soil. The acquiring of this land is expensive. Further, the low value of manure as fertilizer does not warrant the hauling of manure over five miles to seven miles. The handling of the solids and the spreading of the solids is expensive and time consuming. All in all, the spreading of the manure and the droppings requires a large investment for the equipment and the land.

One source of the disposal problems associated with the droppings and manure from a bos is that the digestive system of a bos is inefficient. It is estimated that the bos digests approximately 30% to 70% of the feed, depending upon the feed. Then, the feed which is not digested passes through the bos and becomes droppings and manure. Some investigators have gathered the manure and have refed the manure to the bos. It is estimated that on refeeding the manure to the bos that the bos digests approximately 50% to 70% of the manure. In animal feed, and in manure, there is some indigestible material. For example, the feed to a bos comprises cellulose in the hay, alfalfa, cornstalks and the like. Some of this cellulose is not, readily, digestible by the bos. This cellulose base material passes through the bos to become manure and droppings.

The preceding discussion has been concerned with a cattle feedlot where a number of feeder cattle are concentrated and placed in large pens. These feeder cattle, mainly, eat and rest so as to grow and put on weight to achieve a weight in the range of about 950 pounds to 1100 pounds. The cattle are moved from the feedlot and must be slaughtered for feed. However, the droppings remain and must be processed. Otherwise, after a period of time, the droppings become so large in volume that the feedlot will not function.

With dairy cattle, there is a similar problem as with cattle in a feedlot. For example, the small dairy farmer with 25 to 35 cows, usually, has sufficient pasture for the cows to roam. The concentration of the cows per acre is sufficiently small for the earth to handle all the droppings. With an increasing concentration of cows or increasing size of dairy herds, there is not sufficient room for the cows to roam and for the earth to process the droppings. A small dairy farmer may raise all of his hay and buy feed. Further, a small dairy farmer may put up his own silage so as to buy, only, the grain and concentrate. A dairy farmer with a large herd will raise, substantially, no feed and will buy all of his roughage, such as hay, alfalfa, and will buy silage. Further, the large dairy farmer will buy all his grain and concentrates. The size of a large dairy farmer can vary, for example, a dairy farmer may have 130 cows on 30 acres, or may have 200 cows on 40 acres or may have as many as 600 to 800 cows on 80 acres. The earth does not have the bacterial and chemical capacity to handle the droppings from this large concentration of dairy animals.

With the larger dairy hers, the animals are kept on a concrete pad. The droppings are collected and processed. In one instance, the droppings may be collected and spread by a manure spreader, as solids, on the earth. In another instance there may be a large manure tank. The solid material, such as straw and hay stalks and stalks are pulverized and diminished in size so as to pass through a pump, without clogging the pump. Then, the liquid manure can be spread by a honey wagon or else spread by irrigation pipe onto the ground.

When there is insufficient land to process and handle all the droppings, there is used an oxidation lagoon. For example, there may be a hollow or cavity in the earth and the droppings piped or dumped into this hollows. In time, the droppings are processed by the bacteria and the chemicals in the oxidation lagoon and also by the bacteria and chemicals in the earth. Oxidation lagoons are popular in many areas of the country.

In a copending application, "FACILITIES AND PROCESS FOR MAINTAINING AND FEEDING CATTLE", filing date of Dec. 27, 1971, Ser. No. 212,324, there is described and claimed the facility for handling a large number of bos at one time. For example, in this facility, there may be as many as 6000 dairy cows on 160 acres. The processing of the manure and droppings from this large number of dairy cows can be a big problem. One way of processing and treating the manure and droppings is by an oxidation lagoon. On the 160 acres there is not sufficient land to receive the droppings and manure for treatment by the earth. Therefore, it is necessary to have auxiliary means for processing the droppings and manure. The subject matter of this disclosure teaches of a process for treating the droppings and manure which comprises various materials and chemicals.

Cattle manure is composed of many organic compounds such as undigested fibers and grain, metabolic products, discarded rumen cells, bacterial by-products, minerals, vitamen $B_{12}$, various amino-acids, starch, and sugar.

The cellulosic material in feed and manure can be divided into two categories comprising a potentially digestible fraction and an indigestible fraction. The potentially digestible fraction can be digested by the animal. The indigestible fraction can be made available to ruminants in the animal if the lignin-polysaccharide complex is hydrolyzed chemically prior to refeeding the indigestible fraction.

An object and advantage of this invention is two-fold in that the first part is to lessen or eliminate the manure disposal problem and the second part is to convert the manure into a feed for a bos; another important object is to provide a, substantially, sterile feed for a bos, such as a beef cattle or a dairy cattle and which feed is, generally, more sterile than commercially available feeds; an additional important object is to provide a feed having the protein value and the feed value of, approximately, alfalfa; a further object is to convert some of the indigestible components of the manure to digestible components for feeding to a bos; another concept and advantage is to treat by various individual processes manure to produce different products and then blending the products to form a feed; a further and important object is to provide a feed or a feed supplement which is rich in calcium, protein, and phosphorus; and, an additional object is to provide a low cost feed or feed supplement which can be mixed with grains, hay, silage, alfalfa, and algae.

These and other important objects and advantages of the invention will be more particularly brought forth upon reference to the accompanying drawings, the detailed description of the invention, and the appended claims.

IN THE DRAWINGS

FIG. 1 is a schematic flow diagram in block form illustrating the taking of manure and droppings from a bovine animal, such as a bos, adding various additives to the manure and droppings, to form a mixture, and treating the mixture at an advanced temperature and at an advanced pressure to form various products;

FIG. 2 is a schematic flow diagram, in block form, of a process for taking manure and droppings from a bovine animal, such as a bos, adding an additive to the manure and droppings to form a mixture, treating the mixture at an elevated temperature and an elevated pressure to form a product, mixing the product with various feed material, such as manure or a primary feed, such as grain, silage, alfalfa, hay, haylage, sorghum, and the like, or with manure and the primary feed to form various feeds for feeding to the bovine animal or bos, such as to have a, substantially, closed cycle of feed for the bos;

FIG. 3, in block diagram form, is a schematic flow sheet for taking the product or products from FIG. 1 and FIG. 2, selecting the products, as desired, for mixing with manure, or for mixing with a primary feed, or for mixing with both manure and a primary feed to form a feed or a feed supplement for a bovine animal or bos;

FIG. 4, in block diagram, is a schematic presentation of the processing equipment for processing the waste material to be made into a feed for a bos; and, FIG. 5, in block diagram, illustrates a hydroponic process for liquids in the droppings from livestock.

DETAILED DESCRIPTION OF THE INVENTION

The invention comprises the treating of manure and droppings with various additives at an elevated temperature and an elevated pressure. The additives may be an acid, such as sulfurous acid, sulfuric acid, and phosphoric acid. The additives may be ammonia or ammonium hydroxide. The additives may be an alkali metal and an alkaline earth metal. The additive may be a mixture of ammonia or ammonium hydroxide and an alkaline metal; or ammonia or ammonium hydroxide and an alkaline earth metal; or ammonia or ammonium hydroxide and an alkali metal and an alkaline earth metal. The temperature may be in the range of about 250° F. to, approximately, 400° F., and the pressure may be in the range of about 50 psi to, approximately 250 psi.

The product or products from this treatment with an additive or additives and at an elevated temperature and at an elevated pressure is different than the raw material, i.e., manure and droppings. After being treated at the elevated temperature and pressure, the product is, substantially, sterile and does not contain harmful bacteria. Also, the product may be used as a feed.

The product may be mixed with a feed, such as grain, sorghum, corn, alfalfa, hay, silage, haylage, straw, and the like, to name a few, and refed to the bovine animal. Further, various products may be mixed together and mixed with a feed and refed to the bovine animal. Also, the products, by themselves, may be fed to the bovine animal. These are many ways of treating the product for feeding to the bovine animal or bos.

Figure 1:
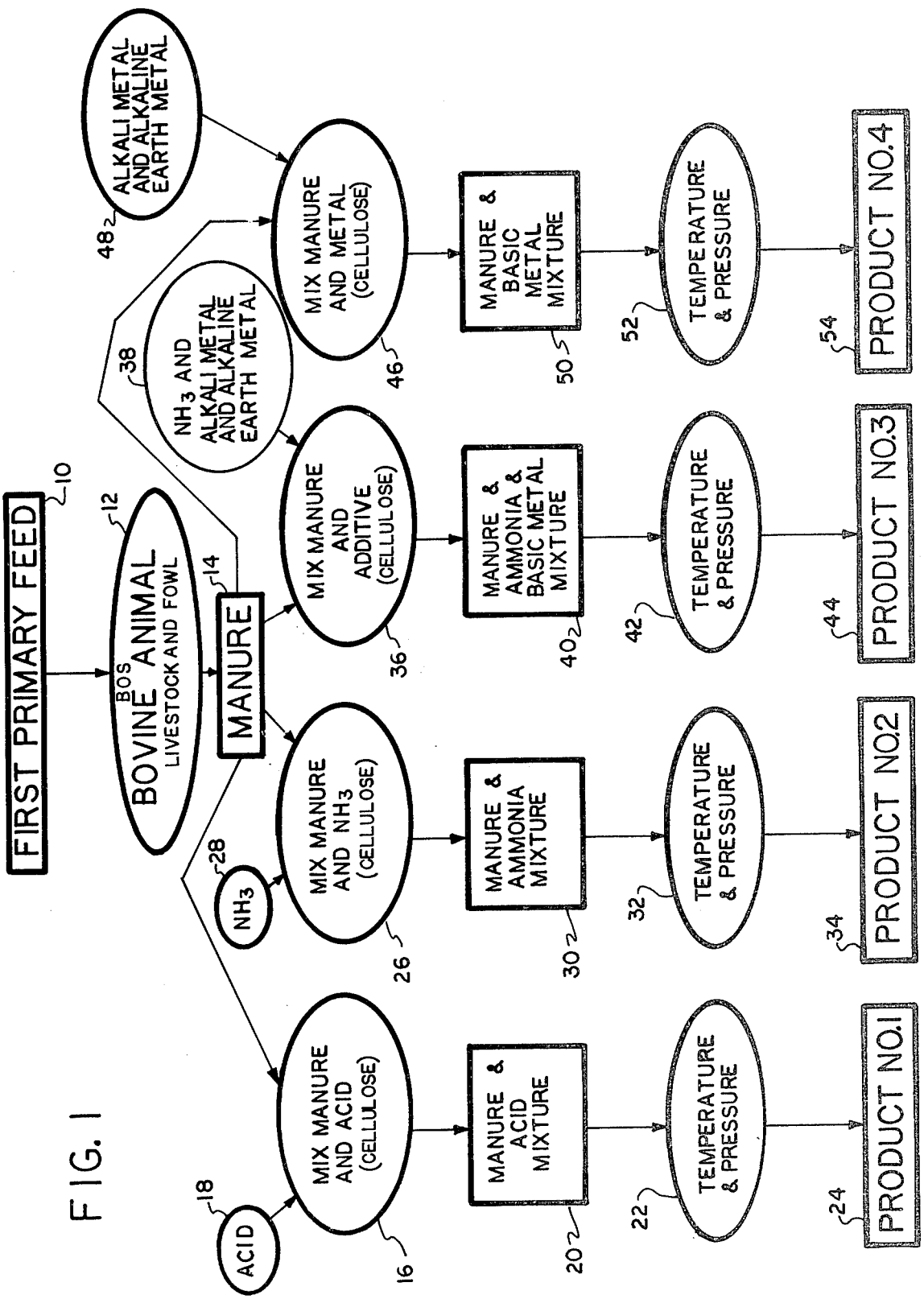

In FIG. 1 there is illustrated, in block form, a schematic flow sheet for treating the manure to make various products.

In FIG. 1 it is seen that a first primary feed 10 is fed to the bovine animal or bos or cattle 12. The first primary feed 10 may comprise grain, which is cracked, whole, rolled, steamed, or ground; sorghum; corn in the kernel form or cracked form or ground form, or an entire ear of ground corn; alfalfa which has been ground, chopped, cubed, or cut; hay which has been ground, chopped, cubed, or cut; silage; haylage which has been ground, chopped, cubed, or cut; and straw which has been ground, chopped, cubed, or cut.

The manure and droppings 14 from the bovine animal may be treated in a number of different ways. For example, the manure may be mixed at 16 with an acid 18 to form a manure and acid mixture.

The acid 18 may be sulfurous acid, sulfuric acid, phosphoric acid; or may be a salt of these acids, such as calcium sulfite or calcium bisulfite; a sulfate, such as calcium sulfate or sodium sulfate; or calcium phosphate; or calcium acid phosphate; trisodium phosphate or sodium acid phosphate ($Na_2HPO_4$ or $NH_2PO_4$).

The manure and acid mixture is subjected to an advance temperature and pressure, such as a temperature in the range of about 250° F. to, approximately 400° F., and a pressure in the range of about 30 pounds per square inch to about 250 pounds per square inch for a suitable period of time in order for this chemical reaction to take place to react with some of the components of manure to form different chemicals. There results a product No. 1 which may be considered an acid product of manure, 24.

Instead of mixing the manure 14 with an acid, the manure 14 may be mixed at step 26 with a weak base, such as ammonia 28 or ammonium hydroxide 28, to form a manure and ammonia mixture 30.

The manure and ammonia mixture 30 is subjected to an elevated temperature and pressure in the range of about 250° F. to, approximately, 400° F., and from about 30 pounds per square inch to about 250 pounds per square inch for a suitable period of time to allow the ammonia to react with the various components of manure to form a new chemical at process step 32.

The resulting product is identified by reference numeral 34 and may be considered to be an ammoniated manure product.

The manure 14 may be mixed at 36 with a mixture of ammonia or ammonium hydroxide and an alkali metal or with ammonia or ammonium hydroxide and an alkaline earth metal, or with ammonia or ammonium hydroxide and an alkali metal and an alkaline earth metal 38 to make a manure and ammonia and basic metal mixture 40. Then, the manure and the ammonia and basic metal mixture 40 is subjected to an elevated temperature in the range of about 250° F. to, approximately 400° F. and a pressure in the range of about 30 pounds per square inch to about 250 pounds per square inch at 42 to form a product No. 3, 44, ammoniated basic manure product.

The manure 14 may be mixed at 46 with an alkali metal or an alkaline earth metal or a mixture of an alkali metal and an alkaline earth metal 48 to form a manure and basic metal mixture 50.

The manure and basic metal 50 may be subjected to an elevated temperature in the range of about 250° F. to, approximately, 400° F. and a pressure in the range of about 30 pounds per square inch to about 250 pounds per square inch at step 52 to form Product No. 4, a basic manure product 54.

A variation on the process illustrated in FIG. 1 is the mixing of manure with an additive and also with a cellulose base material, such as sawdust, wood chips, straw, and paper to break the linkages in the cellulose and to hydrolyze the cellulose to various polysacchrides which can be, readily digested by the bos or bovine animal. For example, the manure and acid and cellulose base material, such as sawdust, wood chips, straw, and paper may be mixed at 16 to form the manure and acid mixture 20.

Also, the above enumerated cellulose base material may also be processed alone without the addition of manure but with the addition of the additives such as a base or an acid, or an alkali metal compound or an alkaline earth metal compound.

Similarly, the manure may be mixed with ammonia or ammonium hydroxide and the cellulose base material, such as sawdust, wood chips, straw, and paper 26 to form the manure and ammonia mixture 30.

Also, the manure may be mixed with ammonia or ammonium hydroxide and an alkali metal, or ammonia or ammonium hydroxide and an alkaline earth metal, or ammonia or ammonium hydroxide and an alkali metal and an alkaline earth metal and a cellulose base material, such as sawdust, wood chips, straw, and paper at 46 to form the manure and ammonia and basic metal mixture 40.

Also, the manure may be mixed at 46 with an alkaline metal or an alkaline earth metal or a mixture of an alkali metal and alkaline earth metal and a cellulose base material, such as sawdust, wood chips, straw, and paper to form the manure and basic metal mixture 50.

As is well known, the linkages in cellulose can be attacked by acid, such as sulfurous and sulfuric acids and, to a degree, by phosphoric acid; can be attacked by ammonia or ammonium hydroxide; and, can be attacked by an alkali metal, or an alkaline earth metal, and mixtures of ammonia and an alkali metal or an alkaline earth metal to yield degradation products which can be more easily digested by the bovine animal or the bos. In this process, it is to be remembered that all of the linkages in the cellulose and other material of manure need not be attacked completely by the first treatment with the additives at the elevated temperature and pressure. The chemicals in the manure can be recycled an indefinite number of times. Upon being recycled an indefinite number of times, some of the linkages will be attacked and broken to yield degradation products. Further, some of the chemicals in the manure will be attacked by the additives, and other chemicals in the manure, to yield new chemicals which can be more readily digested by the bovine animal or bos. Unlike the treatment of a cellulose base material, such as wood chips in the preparation of wood pulp, the impurities need not be, substantially, completely degraded in the first treatment. There can be a number of treatments for degradating the chemicals in the manure and in the cellulose base material.

Some of the waste in the form of manure and droppings may be discarded in a waste stream to reduce the buildup and concentration of insoluble inorganic ash such as sand. However, some of this material may be desirable as bulk roughage to stimulate enzyme secretion in the animals stomach.

Figure 2:
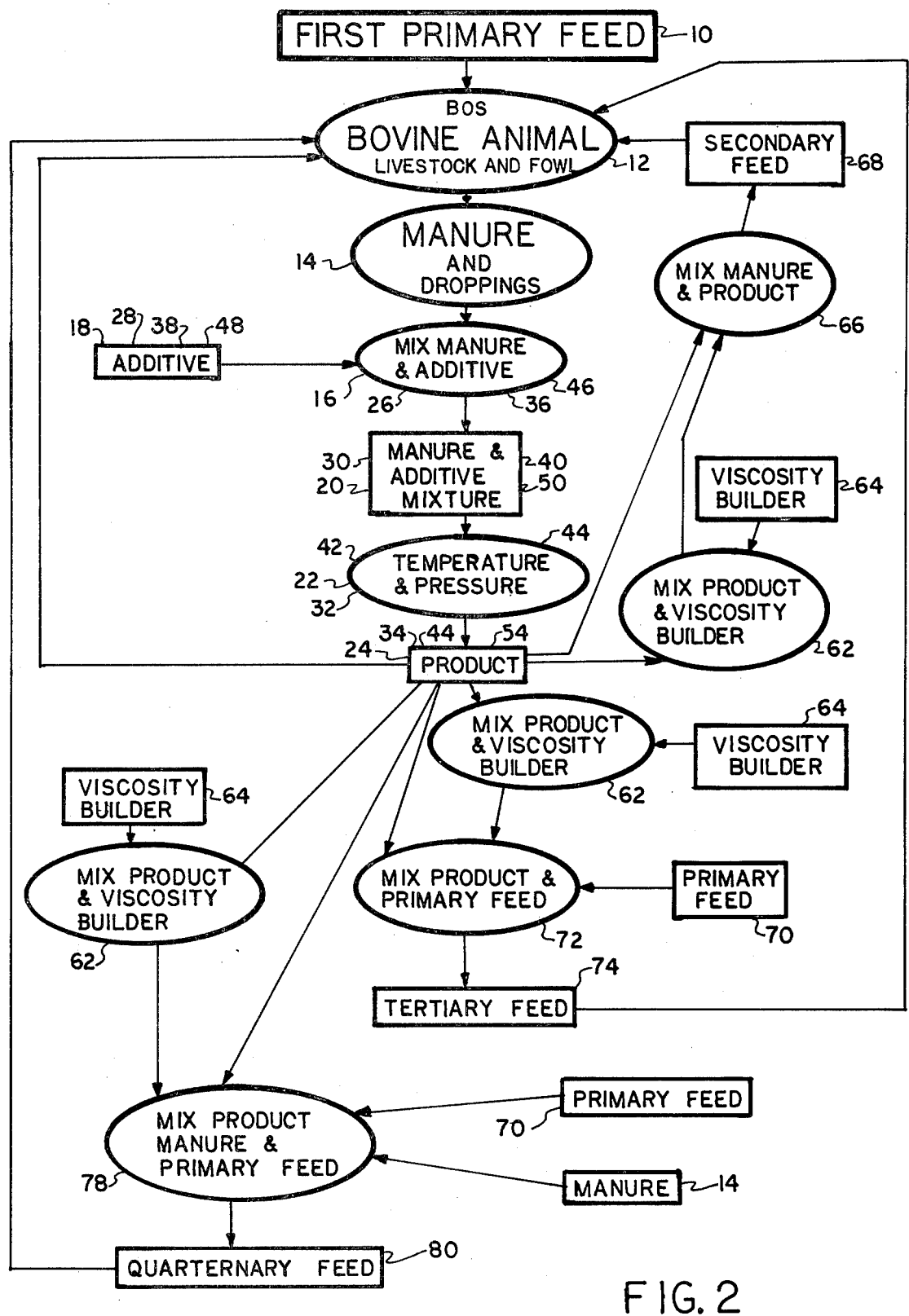

In FIG. 2 there is illustrated a schematic flow sheet wherein a first primary feed is fed to a bovine animal and the manure and droppings are processed to be refed to the bovine animal or bos.

More particularly, it is seen in the schematic diagram of FIG. 2 that a first primary feed 10 is fed to the bovine animal 12. The manure and droppings 14 from the bos 12 are mixed at process step 16, 26, 36, or 46 with an additive 18, 28, 38, or 48, see FIG. 1 and the description from FIG. 1, to form a manure and additive mixture 20, 30, 40, or 50. Then, the manure and additive mixture 20, 30, 40, or 50 is subjected to an advanced temperature in the range of 250° F. to about 400° F., and a pressure in the range of about 30 pounds per square inch to about 250 pounds per square inch. There is produced the product 24, 34, 44, or 54. The above description of the process, additives, and temperature, and pressure, is more completely set forth with respect to FIG. 1 and the description of FIG. 1.

The product 24, 34, 44, or 54, will be referred to by reference numeral 60, for convenience and ease of reference.

The product 60 may be a liquid or a semiliquid. In order to increase the viscosity of the product 60, the product 60 may be mixed at process step 62 with a viscosity builder 64. There are a number of viscosity builders. For example, there may be used methylcellulose, guar gum and gum tragacinth, to name a few viscosity builders. Then, the resulting product may be mixed with manure at process step 66. Instead of mixing the product 60 with a viscosity builder 64, the product 60 may be mixed directly with manure at process step 66 to form a secondary feed 68. The secondary feed 68 may be fed to the bovine animal or bos 12. In this series of steps, part of the manure is treated with an additive and subjected to an elevated temperature and pressure to form a product, and the product, with or without a viscosity builder, is mixed with manure to form a secondary feed 68. With this series of steps, all of the manure is not treated with an additive at an elevated temperature and an elevated pressure.

A modification of this series of processing steps is to mix the product 60 at process step 62 with a viscosity builder 64 and then mix the resulting mixture with a primary feed 70 at process step 72. Or, the product 60 may be mixed directly with the primary feed 70 at process step 72 to form a tertiary feed 74, which can be fed to the bovine animal or bos 12.

Another procedure may be to feed the product 60 directly to the bovine animal or bos 12. For example, the product 60 may be mixed with water and the bovine animal or bos 12 allowed to drink the resulting aqueous mixture. A different procedure is to mix the product 60 at step 62 with a viscosity builder 64 and then to mix the resulting mixture with manure 14 and primary feed 70 at process step 78 to form a quaternary feed 80. Instead of mixing the product 60 with viscosity builder 64, the product 60 may be mixed directly with the primary feed 70 and the manure and droppings 14 to form the quaternary feed 80. Then, the quaternary feed 80 may be fed to the bovine animal or bos 12.

In the schematic diagram of FIG. 2, it is seen that the manure and droppings from the bovine animal 12 are subjected to treatment with an additive at an elevated temperature and pressure. There results a product having characteristics different than the primary feed 10 and also different than the manure and droppings 14. In effect, the manure and droppings 14 are recycled. In time, substantially all of the components or chemicals of first primary feed 10 will be subjected, probably, many times, to the action of the additives 18, 28, 38, or 48 at the process step comprising the elevated temperature and pressure. From these reactions there results many different chemicals. For example, the cellulose is broken down into many polysaccharides which can be more readily digested by the bovine animal or bos 12 than the cellulose itself. Probably, with the repeated subjecting of the chemicals in the primary feed 10 and in the manure 14 to the action of the additives at the elevated temperature and pressure, substantially all of the chemicals will be utilized by the bovine animal or bos 12. There will be close to 100% conversion of the first primary feed by the bovine animal or bos 12 to body weight. By this high conversion of the first primary feed 10 to body weight, as contrasted with the present practice of collecting manure and droppings, there is eliminated the pollution problem from the manure and droppings 14. It is seen that a two-fold objective is accomplished in that the pollution problem from the manure and droppings 14 is eliminated and also that, in time with recycling the manure and droppings 14, the first primary feed 10 is, substantially, completely, converted to body weight of the bovine animal or bos 12.

The product 60 is mixed with a primary feed. The primary feed may be ground or cubed. For example, grain may be ground; sorghum may be ground; corn, either the entire ear of the kernel may be ground; alfalfa may be ground or cubed; hay may be ground or cubed; haylage may be ground or cubed; and straw may be ground or cubed with the product 60 to form a tertiary feed. As, previously stated, the product 60 is, usually, a liquid. The product 60 in the liquid form may be mixed with the ground primary feed. The ground primary feed will absorb much of the moisture. The tertiary feed 74 may be pelleted and the product 60 may function as a binder for the ground primary feed. In the making of pelleted feed from ground primary feed, there is often used a binder, such as molasses. The product 60 may be considered to be similar to molasses and may be mixed with the ground feed and the resulting tertiary feed pelleted for feeding to the animal. In this manner, it is not necessary to add a viscosity builder such as methycellulose or guar gum, or gum tragacinth. If the viscosity of the product 60 is too low, then a viscosity builder can be added to increase the viscosity of the product 60. The product 60 with the viscosity builder can be mixed with the ground primary feed to form a tertiary feed in the pelleted form.

Figure 3:
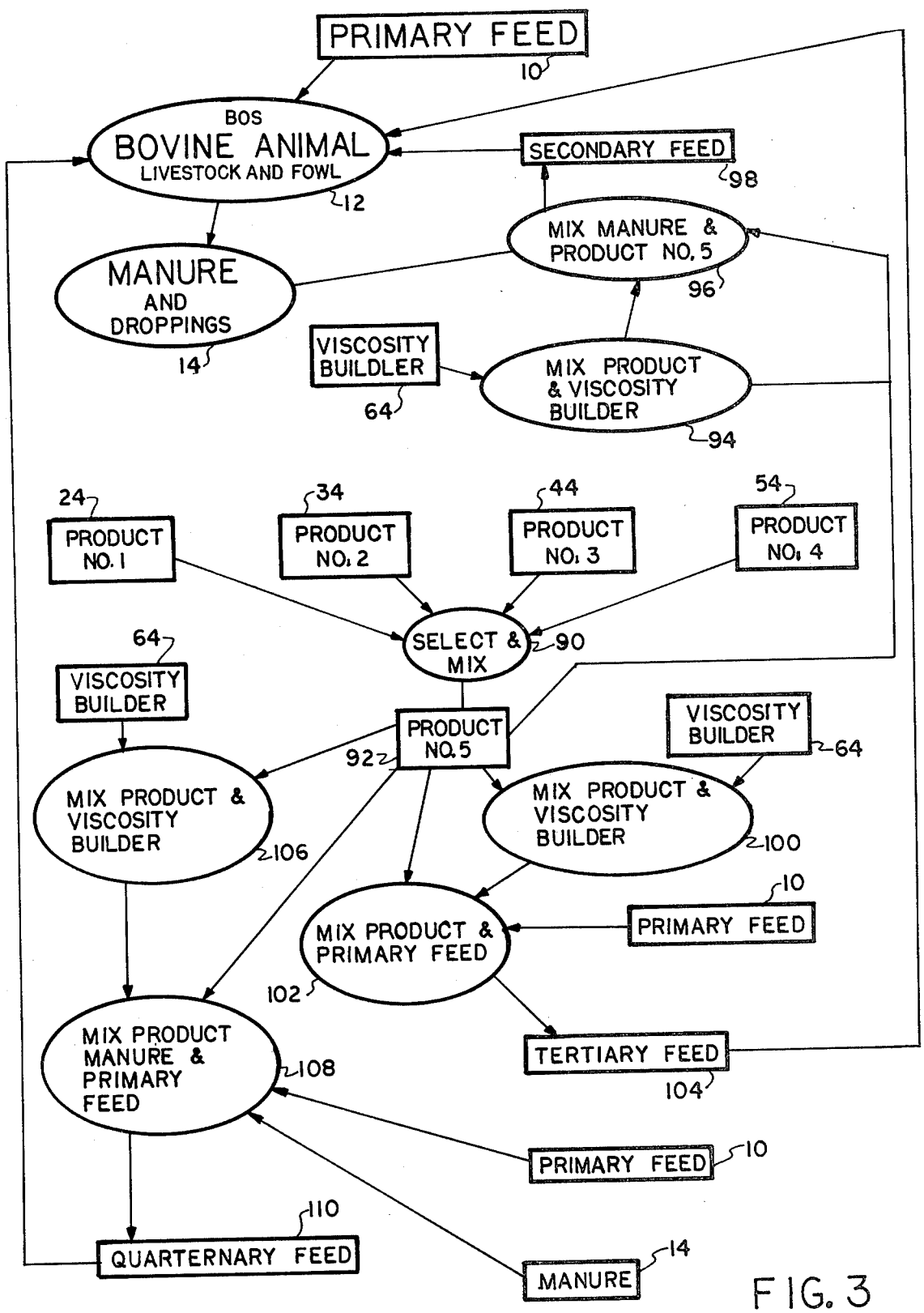

In FIG. 3, there is illustrated another schematic flow sheet and diagram illustrating the formation of a secondary feed, a tertiary feed and quaternary feed with the various products 24, 34, 44 and 54. FIG. 3 can be examined and reviewed in conjunction with FIGS. 1 and 2.

The primary feed 10 is fed to a bovine animal 12 or bos 12. The manure and droppings from the bovine animal 12 is treated and processed as illustrated in FIG. 2 to produce the product as illustrated in FIG. 1 and described with respect to FIG. 1.

In process step 90, the products 24, 34, 44, and 54 are selected and mixed to form a product 92. By way of recall, No. 1, 24, comprises a sulfite radical or a sulfate radical or a phosphate radical. These radicals may be used as a mineral supplement. For example, Product No. 1 may be blended so as to introduce sufficient phosphate or phosphorus into the feed for the bovine animal or bos 12.

Product No. 2, 34, is the result of reacting manure with ammonia or ammonium hydroxide at an elevated temperature and pressure. Reaction of the manure with the ammonia or ammonium hydroxide increases the protein content of the product. In other words, produce 34 has an increased protein content, approaching the protein content of alfalfa.

Product No. 3, 44, is the result of reacting manure with the ammonia or ammonium hydroxide and an alkali metal or an alkaline earth metal, or with both an alkali metal and an alkaline earth metal. The result is a product which has an increased protein content and also may contain desirable minerals, such as sodium and calcium.

Product No. 4, 54, is the result of reacting manure with an alkali metal or an alkaline earth metal at an elevated temperature and pressure. The product may have desirable minerals, such as sodium and calcium.

Product 24 is an acid product. Product 34 is an alkaline product of a relatively low alkaline pH. Products 44 and 54 are alkaline products having a pH in the medium alkaline range. These products can be used as a mineral supplement comprising sodium and calcium.

In selecting and mixing the various products 24, 34, 44, and 54 in step 90, it is desirable to try to realize a product 92 having a neutral pH, i.e., a pH in the range of about 6.5 to about 7.5. The product 24 may be mixed with product 34 or product 44 or product 54 to make a product 92 or may be mixed with product 34 alone or may be mixed with product 44 alone or mixed with product 54 alone, or mixed with the combination of products 34 and 44, or mixed with the combination of products 34 and 54, or mixed with the combination of products 44 and 54. Also, the product 34 may be mixed with the products 44 and 54 or may be mixed with the product 44 alone or mixed with the product 54 alone to make the product 92. In this instance, it may be necessary to mix in a material having an acidic pH to reduce the pH of the product 92 to one acceptable for consumption by the bovine animal or bos 12. Also, the product 44 may be mixed with the product 54 to make the product 92. Again, in this instance, it may be necessary to mix in a material having a relatively low pH to ensure that the resulting feed has a pH suitable to the bovine animal or bos 12. An example of material having a relatively low pH which may be mixed with the alkaline product 92, is silage. Silage has an acidic pH and when mixed with an alkaline product can be mixed in such proportion that the pH of the resulting feed is in the range of about pH 6 to about pH 8 or, preferably, about pH 6.5 to about pH 7.5.

The product 92 resulting from the mixing of selected products 24, 34, 44, and 54, or from the individual products 24, 34, 44, and 54, may be mixed at processing step 94 with a viscosity builder 64. Then, the resulting product may be mixed with manure at processing step 96 to form a secondary feed 98. Instead of mixing the product 92 with a viscosity builder, the product 92 may be mixed directly with the manure at process step 96 to form a secondary feed 98. The secondary feed 98 can be fed to the bovine animal or bos 12.

The product 95 at processing step 100 can be mixed with a viscosity builder 64 and then the resulting product mixed with the primary feed 10 at processing step 102 to form the tertiary feed 104. The tertairy feed 104 can be fed to the bovine animal or bos 12.

Instead of mixing the product 92 with a viscosity builder 64 at process step 100, the product 92 can be mixed with a primary feed 10 at processing step 102 to form the tertiary feed 104 which can be fed to the bovine animal or bos 12.

The product 92 at processing step 106 can be mixed with a viscosity builder 64 and the resulting mixture mixed at step 108 with the primary feed 10 and manure 14 to form the quaternary feed 110 which can be fed to the bovine animal or bos 12.

Instead of mixing the product 92 with a viscosity builder 64, the product 92 can be mixed directly at processing step 108 with the primary feed 10 and the product 14 to form the quaternary feed 110 which can be fed to the bovine animal or bos 12.

From the foregoing, it is seen that it is possible to custom make a feed for feeding to a bovine animal 12 or bos 12. This custom-made feed comprising products made from manure can contain calcium, sodium, phosphorus, sulfur; have a relatively high protein content comparable to that of alfalfa; have a desired pH ranging from a neutral pH to an acidic pH or an alkaline pH; can be mixed with primary feed for supplementing the feed value of primary feeds and for extending the primary feed. Also, the products 24, 34, 44, and 54 and 92 may have a low viscosity and be used as a binder for ground feeds, or may have a relatively high viscosity and still be used as a binder for ground feeds, or may be mixed with molasses and the resulting mixture used as a binder for ground feeds. The ground feeds and binder of the product or the binder comprising the product and molasses may be made into pellets for ease of handling and feeding to the bovine animal or bos 12.

Samples of dairy and feedlot manure were slurried with water or an aqueous mixture of manure. The aqueous mixture of manure was heated to a temperature in the range of 250° F. to 400° F. in a stainless steel pressure box for a sufficient period of time for chemical transformation to take place. The aqueous mixture of manure was converted to a settled sludge of fiber and brown colloidal solids and the supernatant liquid of deep chestnut color with a strong, sweet odor. It would appear that during the reaction, caramelization of the sugars occurred with the production of a thin syrup with a molasses-like appearance and odor. It can be assumed that the thin syrup and product would be acceptable to cattle, as molasses is often used to mask undesirable tastes to cattles, in high protein feeds. Further, culture growth studies showed no signs of living microflora or fauna. This can be interpreted to mean that the resulting product was more sterile and had a lower bacteria count than the primary feed to bovine animals. From a bacteria count and also from a sterility of the feed, less bacteria are introduced to the bovine animal with the resultant product than with the primary feed. A number of samples of the resulting product were tested to determine the total digestible nutrient (TDN). The analytical results were determined and reported by the United States Testing Company. Further, the protein levels were extrapolated from Kjeldahl measurements; fat concentrations were measured utilizing ether extractions of the product; and, the crude fiber content was determined from the volatile residue after caustic digestion of the product. These results are tabulated in the following Table I:

TABLE I

CHEMICALLY DETERMINED TDN
(TOTAL DIGESTIBLE NUTRIENTS)
VALUES FOR MANURES AND PRODUCTS OF MANURES

| SAMPLE | CRUDE PROTEIN | CRUDE FAT | CRUDE FIBER | ASH | TDN |
|---|---|---|---|---|---|
| Raw (Dairy) | 12.3 | 1.96 | 29.9 | 21.01 | 47.9 |
| Neutral Pressure Heated | 12.2 | 3.42 | 32.6 | 21.26 | 47.0 |
| pH 3 Pressure Heated | 12.0 | 3.48 | 28.7 | 18.1 | 50.1 |
| pH 11.7 Pressure Heated | 11.2 | 2.26 | 32.5 | 17.8 | 49.4 |
| Raw (Feedlot) | 18.5 | 3.21 | 19.9 | 18.93 | 51.9 |
| NH₄OH (Feedlot) Pressure Heated | 22.0 | 4.9 | 23.5 | 21.5 | 49.2 |

From the results in Table I, it is seen that the addition of ammoniun hydroxide or ammonia to feedlot manure, prior to the pressure treatment at an elevated temperature, increases the crude protein in the resulting product as compared with the crude protein in the raw feedlot manure. The TDN value appears comparable to those of typical high-grade feed but the change in the TDN value is minor from the raw manure to the manure which has been pressure treated at an elevated temperature. From a knowledgd of the chemical reaction in this field, it would appear reasonable that the TDN value would increase with treatment at elevated pressure and temperature. One explanation for the small change in the TDN values would be the manner of calculating these TDN values. In the calculation of the TDN values formulas were employed to convert the data from the chemical tests into the TDN values. No measures were taken to evaluate the actual In Vivo digestibility of the individual constituents of the raw manure and the products from the raw manure. The chemically determined TDN values do not reflect the true value of the total digestible nutrients in the products to a bovine animal or bos.

In Vivo digestibility tests were run on a number of samples. To run an In Vivo digestibility test, analysis samples were dried, weighed, and placed in nylon bags. The nylon bags were then inserted into a cow's stomach by an opening in the side of the cow. After an appropriate resident time, the nylon bags were withdrawn and weighed to determine the amount of sample, in the bag, that the cow was able to dissolve and withdraw from the bag. This provides a relatively rapid means of obtaining valuable data on the potential of total digestible nutrients in both the raw manure and in the products resulting from the treatment of the raw manure at an elevated temperature and pressure. The result of these tests on fistulated cows was give in TABLE II.

TABLE II

RESULTS IN VIVO DIGESTIBILITY STUDIES
FOR TOTAL DIGESTIBLE NUTRIENTS (TDN)
ON MANURE AND PRODUCTS OF MANURE

| | |
|---|---|
| Raw Feedlot Manure | 32.0% digestible |
| Feedlot Manure Caranulized at pH 11 | 38.3% digestible |
| Feedlot Manure Caranulized under Neutral Conditions | 44.1% digestible |
| Dairy Manure Caranulized under 10 Neutral Conditions | 35.8% digestible |
| Dairy Manure Caranulized at pH 11 | 46.0% digestible |
| High Grade Alfalfa | 56.0% digestible |

In TABLE II, it is seen that the In Vivo digestibility studies for total digestible nutrients indicate that there is an increase in digestibility upon treatment of the manure at an elevated temperature and pressure. For example, raw feedlot manure has a digestibility of about 32%. If the feedlot manure is treated at a pH of 11, by the addition of sodium hydroxide, and caramelized, the digestibility increases 38.3%. Caramelized feedlot manure which is subjected to high temperature and pressure under, substantially, neutral conditions, has a digestibility of 44.1%. As contrasted with feedlot manure caramelized under neutral conditions, neutrally caramelized dairy manure has a lower digestibility of 35.8%. Caramelized dairy manure treated at a pH of 11 has digestibility of about 46%. By way of comparison with standard feed, high grade alfalfa was used as a standard feed and the digestibility of high grade alfalfa was 56%. Roughly, the treatment of the raw manure at an elevated temperature and pressure increases the digestibility of the manure, depending upon the pH of the manure undergoing treatment, from about 10% to about 40%. Actually, except for the carmelized neutral dairy manure, there is an increase of about 20% to 40% in the digestibility of the contents of the manure.

To further study the effects of treatment of the manure, two identical precision autoclaves were selected for parallel runs to study the effects of temperature, pressure, detention time, pH, and chemical additives. The manures for each set of tests were taken from a common slurry of manure and water. The following tests were run on the products from the treatment at an elevated pressure and temperature. These tests were:

1. Supernatant TOC (total organic carbon)—filtrate samples of the product were analyzed for total organic carbon content to indicate the amount of organic material which had been solubilized. The organic carbon in this stage should be available to the cow either directly or else by means of rumen fermentation of the organic materials. 2. Water, volatile, and ash fractions—samples of the product were weighed, dried at 105° C., reweighed, ashed at 600° C. for one hour, and weighed again. The differential between the first and second weighings indicate the percentage of the product which is water. The differential between the second and third weighings represents the volatile reaction, and the final weight indicates the ash content of a product. The water content changes are related to production of water through oxidation of volatiles and other chemical changes. Loss of these volatiles can mean a wasted food value of a product which is not available for feed. Higher volatile contents are desirable since these higher volatile contents represent a major portion of the food value and energy content of the product. The ash represents the minerals and organic residues. Some of the ash is acid soluble and will be dissolved by the acids in the cow's stomach and will provide nutrition value to the cow. An ash level should be low and, not excessively high. 3. Total Kjeldahl nitrogen-TKN—Total Kjeldahl nitrogen gives a measure of nitrogen levels available as organic nitrogen or ammonia. Using a conversion factor of 6.25, this number can be translated to equivalent protein. It is desirable to have a high protein content. The nitrogen losses generally occur by oxidation of the nitrogen compounds to nitrates. Therefore, a conversion to nitrate represents a loss in terms of total nutritional value of the feed to the cow. It is not desirable to have a full conversion of nitrogen compounds to nitrate. 4. Energy level—a standard bomb calorimeter evaluation was made to measure the physical energy level of dried product samples. These determinations of the physical energy level define absolute energy level.

In the following TABLE III, there is summarized a series of tests wherein manure was subjected at different temperature and pressure and with different additives to reaction in a stainless steel pressure bomb.

TABLE III
CHEMICAL ANALYSES OF PARAMETER TESTING SETS

| Set #1 (2 hr-Sat. Press) | 300° F. | 350° F. | 400° F. |
|---|---|---|---|
| TOC mg/l | 14,000 | 13,200 | 12,000 |
| % H₂O | 91.62 | 91.17 | 91.62 |
| % Volatiles | 6.20 | 6.12 | 5.69 |
| % Ash | 2.18 | 2.71 | 2.69 |
| % Ash Dry Basis | 26. | 30. | 32. |
| TKN ppm | High | Lower | Lower |
| % Protein Dry Basis | — | — | — |
| Energy Level Cal/g (BTU/lb) | 3908 (7035) | 4572 (8229) | 4523 (8140) |

| Set #2 (300° F. 2 hr) | Sat Press (51 psi) | 200 psi | 300 psi |
|---|---|---|---|
| TOC mg/l | 16,000 | 19,600 | 17,400 |
| % H₂O | 84.30 | 85.70 | 88.20 |
| % Volatiles | 10.58 | 9.55 | 7.66 |
| % Ash | 5.12 | 4.75 | 4.14 |
| % Ash Dry Basis | 33. | 33. | 35. |
| TKN ppm | 3,650 | 3,650 | 2,910 |
| % Protein Dry Basis | 14.5 | 15.6 | 15.7 |
| Energy Level cal/g (BTU/lb) | 3041 (5473) | 3114 (5604) | 3455 (6212) |

| Set #3 (350° F. Sat Press) | 30 min. | 1 hr. | 2 hr. |
|---|---|---|---|
| TOC mg/l | 26,000 | 20,000 | 20,000 |
| % H₂O | 81.5 | 83.0 | 80.5 |
| % Volatiles | 11.0 | 12.6 | 15.6 |
| % Ash | 7.5 | 4.4 | 5.9 |
| % Ash Dry Basis | 41. | 26. | 28. |
| TKN ppm | 4,284 | 3,916 | 4,011 |
| % Protein Dry Basis | 14.5 | 14.4 | 11.7 |
| Energy Level cal/g (BTU/lb) | 3299 (5938) | 3284 (5912) | 3581 (6447) |

| Set #4 (350° F. Sat. Press, 30 min) | Additive Original Lime - pH 11.4 |
|---|---|
| pH of slurry (Final) | 6.4 |
| TOC mg/l | 22,500 |
| % H₂O | 83.3 |
| % Volatiles | 12.0 |
| % Ash | 4.7 |
| % Ash Dry Basis | 28. |
| TKN ppm | 3,795 |
| % Protein Dry Basis | 14.2 |
| Energy Level cal/g (BTU/lb) | 3304 (5947) |

| | original pH Caustic additive - NaOH | | | |
|---|---|---|---|---|
| Set #5 | pH 9 | pH 10 | pH 11.4 | pH 12 |
| pH of slurry (Final) | 4.8 | 5.8 | 8.1 | 12 |
| TOC mg/l | 14,800 | 22,400 | 26,400 | 38,000 |
| % H₂O | 85.4 | 84.3 | 80.9 | 80.9 |
| % Volatiles | 10.0 | 11.0 | 13.8 | 14.7 |
| % Ash | 4.2 | 4.7 | 5.3 | 4.4 |
| % Ash Dry Basis | 30. | 30. | 28. | 23. |
| TKN ppm | 3,540 | 3,293 | 3,679 | 3,129 |
| % Protein Dry Basis | 15.6 | 13.1 | 12.0 | 10.7 |
| Energy Level cal/g (BTU/lb) | 3802 (6843) | 3359 (6046) | 2984 (5371) | 2285 (4113) |

| Set #6 | Additive original NH₄OH - pH 10.6 |
|---|---|
| pH of slurry (Final) | 10.0 |
| TOC mg/l | 14,400 |
| % H₂O | 82.5 |
| % Volatiles | 13.3 |
| % Ash | 4.2 |

TABLE III-continued
CHEMICAL ANALYSES OF PARAMETER TESTING SETS

| % Ash Dry Basis | 24. |
|---|---|
| TKN ppm | 17,560 |
| % Protein Dry Basis | 72.7 |
| Energy Level cal/g (BTU/lb) | 3232 (5818) |

In Set #1, the time of reaction was 2 hours at a saturated pressure for three different temperatures of 300° F., 350° F., and 400° F. The results in Set #1, indicate that the TOC decreased with temperature and pressure. The decrease in TOC indicates that chemical reactions have taken place, and new chemical compounds have been formed. The percent of water in the product was substantially the same for the three different temperature reactions. The percent volatiles in the product decreased with an increase in temperature, indicating that larger chemical molecules were formed. The ash increased with increased temperature. The total Kjeldahl nitrogen decreased with an increase in temperature although the results are, mainly, qualitative. The percent protein on a dry basis was not determined. The energy level of the product increased with an increase in temperature from 300° F. to 350° F. The energy level of the product was about the same for the reaction temperature of 350° F. to 400° F. It is to be recalled that in Set #1 raw manure was subjected to an elevated temperature and pressure, i.e., raw manure without an additive being present.

In TABLE III, Set #2, the manure was treated without an additive present, in a stainless steel pressure bomb at a temperature of 300° F., for 2 hours under varying pressure conditions of 51 psi, 200 psi, and 300 psi. The elevated pressures were realized by the addition of an inert gas, such as nitrogen, under pressure. In Set #2, it is seen that with increase in pressure, the total organic carbon increases and then decreases with a further increase in pressure. The total organic carbon is highest at 200 psi. With an increase in pressure, the percent of water in the product increases. With an increase in pressure, the volatiles decrease. This suggests that a chemical reaction has taken place with an increase in pressure at a temperature of 300° F. so as to form larger molecules, non-volatile molecules, and, also, to form carbon dioxide. Further, the percentage of ash decreases with an increase in pressure, with the lowest ash being at 300 psi. The total Kjeldahl nitrogen decreases with an increase in pressure. Possibly, some of the nitrogen has been converted to a form which is not measurable by the Kjeldahl method.

The percent protein on the dry basis increases with an increase in pressure, although for the pressure of 200 psi and for the pressure of 300 psi, the percent protein remains substantially constant. The energy level increases with an increase in pressure. The biggest jump in the energy level is from a pressure of 200 psi to a pressure of 300 psi.

In Set #3, the temperature was held constant at 350° F. while the manure was subjected to elevated temperature and pressure in a stainless steel bomb for time periods of 30 minutes, 1 hour, and 2 hours. At 30 minutes, the total organic carbon was 26,000 mg and decreased to 20,000 mg for 1 hour and 2 hours. This indicates that a chemical reaction occurred wherein soluble organics were oxidized to shorter chain organics and carbon dioxide. The percent water remained in substantially the same range increasing from 30 minutes to one-hour reaction time and then decreasing from one-hour to two-hour reaction times. The percent of volatiles in the product increased with the increased reaction time. This also suggests that a chemical reaction took place which formed more volatile compounds. The percent ash in the product decreased from 30 minutes to one-hour reaction time and then increased from one-hour reaction time to two-hour reaction time. However, the largest percentage of ash was at 30 minutes reaction time. The total Kjeldahl nitrogen decreased from 30 minutes to one-hour reaction time and then increased a small amount from one-hour to two-hour reaction time. At 30 minutes the total Kjeldahl was the largest. The percent protein on a dry basis decreased slightly from 30-minute reaction time to one-hour reaction time and then decreased considerably from one-hour reaction time to two-hour reaction time. The energy level remained substantially constant at 30 minutes and one-hour reaction times but increased about 10% from one-hour to two-hour reaction times. This indicates that the breakdown of the larger molecules into smaller molecules which can be more readily digested by the bovine animal or bos.

In Set #4, the manure was mixed with lime so as to have an original pH of 11.4. A pH of this value indicates a caustic mixture or a highly alkaline mixture. In the stainless steel pressure bomb, the manure was subjected to a temperature of 350° F. for 30 minutes. The pH of the product was determined and the resulting pH was 6.4, slightly acid. 6.4 may be considered to be in the neutral range. The total organic carbon was 22,500 mg per liter. This is a high total organic carbon as compared with the products of Sets Nos. 1, 2, and 3. This high total organic carbon indicates that the molecules have been degraded and broken into smaller molecules which are soluble in the filtrate. The percent water in the resulting product was in the range for the product of Set #3. Also, the percent volatiles was in the range for the volatiles of Set #3. The percent ash was in the range of previous percentages of ash for Sets Nos. 1, 2, and 3. The total Kjeldahl nitrogen was in the range as expected from Sets Nos. 2 and 3, as well as the protein on a dry basis being in the expected range. Also, the energy level was in the range as expected from Sets Nos. 2 and 3. An interesting feature of Set #4 is that even though the pH of the original manure mixture was quite a high pH of 11.4, that after the reaction process had been completed, the pH was slightly acid. With reference to FIG. 1, it can be seen that the manure and the lime mixture 50 has a pH of 11.4 but after being subjected to a temperature and pressure 52 to form product No. 54, the pH had been reduced to about 6.4 for product No. 54.

In Set #5, the manure, see FIG. 1, was mixed with caustic, sodium hydroxide, to form the manure and sodium hydroxide mixture 50 which was then subjected to a temperature of about 350° F. at saturated pressures for 30 minutes to form product No. 54. Four separate mixtures of sodium hydroxide and manure were formed to have a pH of 9, pH of 10, pH of 11.4, and a pH of 12. The resulting product had varying pH's. For the mixture having a pH of 9, the resulting product had a pH of 4.8; for the original mixture having a pH of 10, the resulting product had a pH of 5.8; for the original mixture having a pH of 11.4, the resulting product had a pH of 8.1; then, for the original mixture having a pH of 12, the resulting product had a pH of 12. Except for the original mixture having a pH of 12, it can be seen tha the three other original mixtures of manure and sodium hydroxide that at the elevated pressure and temperature, there was considerable acid produced to lower the pH of the resulting product to a pH less than that of the original mixture. Also, it can be seen that with an increase in pH, the resulting product has a higher total organic carbon content. In fact, with an original mixture having a pH of 9, the total organic carbon content was 14,800 mg per liter, while for a pH of 12, the product had 38,000 mg per liter, or twice as much total organic carbon. This indicates that the caustic has acted upon the more insoluble long chain polymers in the manure, viz., cellulose, to break the long chain polymers into shorter chains which are soluble. Another way of considering this is that the long-chain, insoluble and undigestible polymers have been broken to form short-chain, soluble digestible polymers, such as polysacchride. Also, the percent water in the product decreased with an increasing original pH mixture which indicates that some of the original water reacted with the polymer. The percent of volatiles increased with an increase in the original pH. This is feasible because of the strong action of the sodium hydroxide there could easily be produced a number of shorter-chain chemicals which are readily volatile. The percent ash increased and then decreased with an increased concentration of sodium hydroxide. The total Kjeldahl nitrogen fluctuated with a variation in pH. The total Kjeldahl nitrogen was highest for an original pH of 11.4 and was lowest for an original pH of 12. The protein on a dry basis decreased with an increase in pH of the original manure and sodium hydroxide mixture. This indicates that some of the nitrogen present was reacted to such an extent that it was not available as protein. Further, the energy level of the product decreased with an increase in pH of the original mixture. This would also indicate that some of the material was reacted to such an extent that it was no longer available to supply energy to the bos or bovine animal.

In Set #6, the manure was mixed with ammonium hydroxide or ammonia at step 26 to form the mixture 30. The mixture 30 was reacted at step 32 to form product #34. The pH of the original manure-ammonium mixture was about 10.6 and the pH of the product was about 10.0. This indicates that some acid was formed in the reaction. Also, it indicates that less acid was formed in the reaction in the stainless steel pressure bomb with ammonia than with lime or sodium hydroxide. Possibly, the reason for this is that the ammonium hydroxide at the elevated temperature and pressure does not break the linkage as readily as lime and sodium hydroxide. Also, the total organic carbon content was less than with lime or sodium hydroxide reacting with manure. The percent water in the product was in the range as expected from the values of Sets Nos. 2 and 3, 4 and 5. The percent ash was in the range as expected of about 4.2%. The total Kjeldahl nitrogen was highest for the product resulting from the reaction of ammonium hydroxide and manure. It is seen that the total Kjeldahl nitrogen is approximately four to five times that for the highest value of that for Set #2 and about four times that for the highest value of that for Set #3, and about four to five times the highest value for Set #4 and approximately five times the highest value for Set #5. Apparently, the ammonia reacts with the chemicals in the manure and reacts to increase the total Kjeldahl nitrogen content. Also, the percent protein has increased considerably in the product as compared with products of Sets Nos. 2, 3, 4, and 5. More particularly, the percent protein is approximately four to five times the highest value of Set #2; approximately five times the highest value of Set #3; approximately five times the highest value of Set #4; approximately four to five times the highest value of Set #5. This also indicates that the ammonia has reacted with the chemicals of the manure to form a protein. The energy level of the product is within the range as expected from the values of Sets 2, 3, 4, and 5.

From the foregoing results of treating manure at various temperatures and pressures and with various additives, there may be a synergistic effect of treating manure with an additive of ammonium hydroxide or ammonia coupled with lime, an alkaline earth metal, or treating manure with ammonia or ammonium hydroxide and an additive of sodium hydroxide, an alkali metal, at an elevated temperature and pressure. The higher caustic in the manure and mixture makes it possible to break the long-chain polymers into more shorter chain polymers which are more readily digestible by the bovine animal or bos, while the treatment with ammonia makes it possible to form more protein and to increase the food value of the resulting product. In this regard, the reader is advised to review FIG. 1 and consider the mixing of alkali metal and ammonia, or alkaline earth metal and ammonia, or an alkali metal and an alkaline earth metal and ammonia at step 36 to form the mixture 40 and then subjecting the mixture 40 to an elevated temperature and pressure 42 to form the product No. 44 which will have a higher protein value than the original manure. In fact, the protein value, see Set #6, is amazingly high. Obviously, the treatment of manure with ammonia or with a mixture of ammonia and an alkali metal or an alkaline earth metal can result in a product having beneficially high protein content.

Initial selections of test parameter boundaries reflect both previous analytical results and judgements concerning the cost of full-scale operations and equipment. Set #4 focuses in on what appear to be the critical points. Caustic is clearly the more effective degradation agent. At a pH of 12, the process attacks cellulose fibers. The increase in TOC appears to bear this out. NH4OH on the other hand is both less expensive and more desirable from a nutritional standpoint, since nitrogen in this form is converted to protein in the cow's stomach. This suggests uses of a mixed feed whereby NH4OH is utilized to drive pH to the 10-11 level with NaOH added to increase this to pH 12.

It is interesting to note that the pH drops with processing. Presumably organic acids are a primary oxidation product. Similar observations have been made with regard to fermentation processes. In the fermentation work, reneutralization with ammonia caused formation of additional amino acids. While cows are efficient amino acids formers, preformation of the amino acids can be desirable. It is the formation of acids in general, however, that is of the most interest since it is organic acids formed by rumen fermentation that serve as the major nutrient utilized by cattle.

Samples processed at higher pH levels had increasingly lower energy values. The energy loss with alkalinity may not be of concern. This could be a reflection of cellulosic fiber degradation and as such would not be reflected in digestible or metabolizable energy levels.

The high pH caustic levels appear to overwhelm organic acid production and hence result in a very alkaline product. Neutralization will be required on such products prior to refeed. This could be achieved with direct addition of phosphoric acid which would in turn augment desirable phosphate levels. A second approach suggests itself, however.

It is well known that acid digestion is also capable of hydrolyzing cellulosic fibers. Use of acid, in fact, can degrade some organic structures not susceptible to attack by caustic. To capitalize on this, the influent manure stream could be divided. One fraction would be slurried at pH 12 using an NH4OH-NaOH mix and carmelized while the second would be taken to a lower pH with H3PO4 and caramelized. The streams would be mixed after treatment so that neutralization would result. Heat of reaction from the neutralization could be used to volatilize some of the excess water or for pretreatment of the influent stream through use of a heat exchanger. If mixing is good, up to 75 percent of all fibers will have received both modes of treatment after 3 process cycles. Little, if any, fiber should be able to withstand degradation from these processes with acidic chemicals and with caustic chemicals.

In order to determine the optimum low pH, a fifth set of samples was processed yielding the results listed in Table 4.

A steam leak on the pH 3.5 sample allowed steam and gaseous organic materials to escape during the reaction phase. This explains the lower water content and the fact that the material in this sample was markedly charred. The trend of the other two pH level samples indicates a pH range of 3-4 should be satisfactory. The products display a rich, sweet, aromatic odor indicating caramelization was achieved.

In the following TABLE IV, there is presented a set of results for the treatment of manure at a temperature of 350° F., saturated pressure, for 30 minutes in a stainless steel pressure bomb with phosphoric acid. There were prepared three mixtures of phosphoric acid and manure, see FIG. 1, wherein it is illustrated that manure and phosphoric acid were mixed at step 16 to form the acid mixture 20, which in turn was subjected to temperature and pressure at step 22 to form product #24. The original pH of one of the mixtures was 3.5 while the pH of the product was 3.9; in another mixture the pH was 2.5 which the pH of the product was 3.6; and, in another mixture the pH of the original mixture was 2 while the pH of the resulting product was 2.9. In all instances, the pH of the resulting product was higher than the pH of the original acid and manure mixture. The total organic carbon content increased from a pH, original mixture, of 3.5 to 2.5 and then decreased to a pH of 2. Possibly, due to a steam leak for the mixture of phosphoric acid and manure for the mixture having an original pH of 3.5, some of the volatiles were lost and the total organic carbon content of the resulting product should have been greater than for the product resulting from the mixture whose original pH was 2.5. In this regard, the water content of the product resulting from the mixture having an original pH of 3.5 was less than for the two other products. Again, a steam leak may have had some effect. The percent volatiles in the resulting product varied—it decreased for the product from the original mixture having an original pH of 3.5 to the mixture having a pH of 2.5 and then increased slightly to the product from the mixture having a pH of 7.8. The percent ash also varied considerably with the highest value being for the product resulting from the original mixture having a pH of 3.5 and the lowest value in the product resulting from the original mixtures having a pH of 4.8. The total Kjeldahl nitrogen percentage varied. Again, the product resulting from the original mixture having a pH of 3.5 is questionable from the standpoint of the steam leak. Possibly, this product does not have a high total Kjeldahl nitrogen content as indicated because of the steam leak. The percent protein decreased with the increase in the acid concentration of the original mixture. Also, the energy level decreased with the increase in the acid concentration of the original mixture.

TABLE 4

Chemical Analyses of Low pH Processed Manures

| Set #5 | pH 3.5 (steam leak) | pH 2.5 | pH 2. |
|---|---|---|---|
| (350° F. Sat. Press, 30 min $H_3PO_4$) | | | |
| pH | 3.9 | 3.6 | 2.9 |
| TOC mg/l | 11,040 | 12,680 | 11,600 |
| % $H_2O$ | 81.7 | 87.7 | 86.1 |
| % Volatiles | 10.9 | 7.5 | 7.8 |
| % Ash | 8.4 | 4.8 | 6.1 |
| % Ash Dry Basis | 43.5 | 38.8 | 43.9 |
| TKN ppm | 4,677 | 2,974 | 3,354 |
| % Protein Dry Basis | 15.97 | 15.11 | 15.08 |
| Energy Level cal/g (BTU/lb) | 3501 (6302) | 3314 (5966) | 2805 (5049) |

The resulting products from treatment of manure at an elevated temperature and pressure in the presence of lime or ammonia or sodium hydroxide or mixtures of these and also the product from the treatment of namure at an elevated temperature and pressure with phosphoric acid give the possibility of mixing these products to form a desired feed, see FIG. 3, wherein the concentration of the sodium hydroxide can be varied; the concentration of the phosphorus can be varied; and, the resulting product rich in protein can be formed.

In Vivos digestibility tests were made on some of the dry products. As is recalled, in this form of tests, samples of products are dried, weighed, and placed in nylon bags which are inserted in a cow's stomach by means of an opening in her side. After an appropriate residence time, the samples are withdrawn, dried, and reweighed to determine the amount of the sample the cow was able to dissolve and withdraw from the bag.

In an accompanying TABLE V, it is seen that the total digestible nutrient on a dry weight basis, or raw feedlot manure was 22.2%.

TABLE V

IN VIVO DIGESTIBILITY OF SELECTED CARMELIZED MANURES

| Sample | Total Digestible Nutrients - Dry Weight Basis |
|---|---|
| Raw Manure (Feedlot) | 22.2% |
| Raw Manure Enzyme | 21.7% |
| pH 12 (Caustic - NaOH) | 81.0% |
| pH 11.4 (Caustic-NaOH) + Enzyme | 51.0% |
| pH 10.6 ($NH_4OH$) | 45.2% |
| pH 2.5 ($H_3PO_4$) | 38.3% |
| High Grade Alfalfa | 56.8% |

A mixture of raw feedlot manure and an enzyme, the enzyme being at 0.1%–0.2% feed level, resulted in 21.7% total digestible nutrients, substantially the same as for raw feedlot manure. The effect of the enzyme, apparently, had no noticeable affect on the total digestible nutrients. The enzyme was Cellulose 4,000 produced by Miles Laboratories. This proprietary material was an extract from aspergillus niger and was claimed to be an effective degradative agent for use on cellulose fibers. The product prepared from manure and an additive, sodium hydroxide, in which the original mixture had a pH of 12 have a high total digestible nutrient value of 81%, the highest value of the material tested in these In Vivo digestibility tests.

A mixture of the product resulting from an original mixture of sodium hydroxide and manure and such mixture had a pH of 11.4, with the enzyme resulted in a TDN value of 51%, considerably, higher than the value from raw feedlot manure.

The product resulting from the mixture of manure and ammonium hydroxide or ammonia and which mixture had a pH of 10.6 gave a TDN value of 45.2, again, higher than for raw feedlot manure.

The product resulting from the mixture of manure and phosphoric acid and which mixture had an original pH of 2.5 gave a TDN value of 38.3, again, higher than for raw feedlot manure.

As a scale in regard to TDN, there was used high grade alfalfa which gave a value of about 56.8% TDN.

From the foregoing information, see TABLES II, III, IV and V, it is seen that the raw manure can be treated with various additives, such as phosphoric acid, lime, ammonia, and sodium hydroxide. The treatment with more caustic materials, such as sodium hydroxide, increases the TDN of the product resulting from the manure and additives treated at an elevated temperature and pressure. Also, the treatment with phosphoric acid at a relatively low pH at an elevated temperature and pressure increased the TDN of the product. If the manure is divided into a portion for treatment with phosphoric acid and a portion for treatment with ammonium hydroxide or ammonia and a portion for treatment with sodium hydroxide or lime, then, after three process cycles up to about 75% of all fibers of the manure will have received treatment by phosphoric acid and the ammonia and the lime and sodium hydroxide. It is conceivable that little, if any, of the fibers should be able to withstand degradation after treatment with these additives at an elevated temperature and pressure. In other words, almost all of the fibers will have been degraded to form products which can be more readily digested by the bos or bovine animal.

In treating the manure, the manure can be divided into various fractions as illustrated in FIG. 1 and then treated with the additives and then the fractions combined as illustrated in FIG. 3. In this way, advantage can be taken of adding calcium to the feed and adding phosphate to the feed and increasing the protein content by digesting with ammonia or ammonium hydroxide at an elevated temperature and pressure. There is also an advantage in digesting with sodium hydroxide at an elevated temperature and pressure to degrade the fiber. The resulting products can be combined into a feed or feeds as illustrated in FIG. 3.

Figure 4:
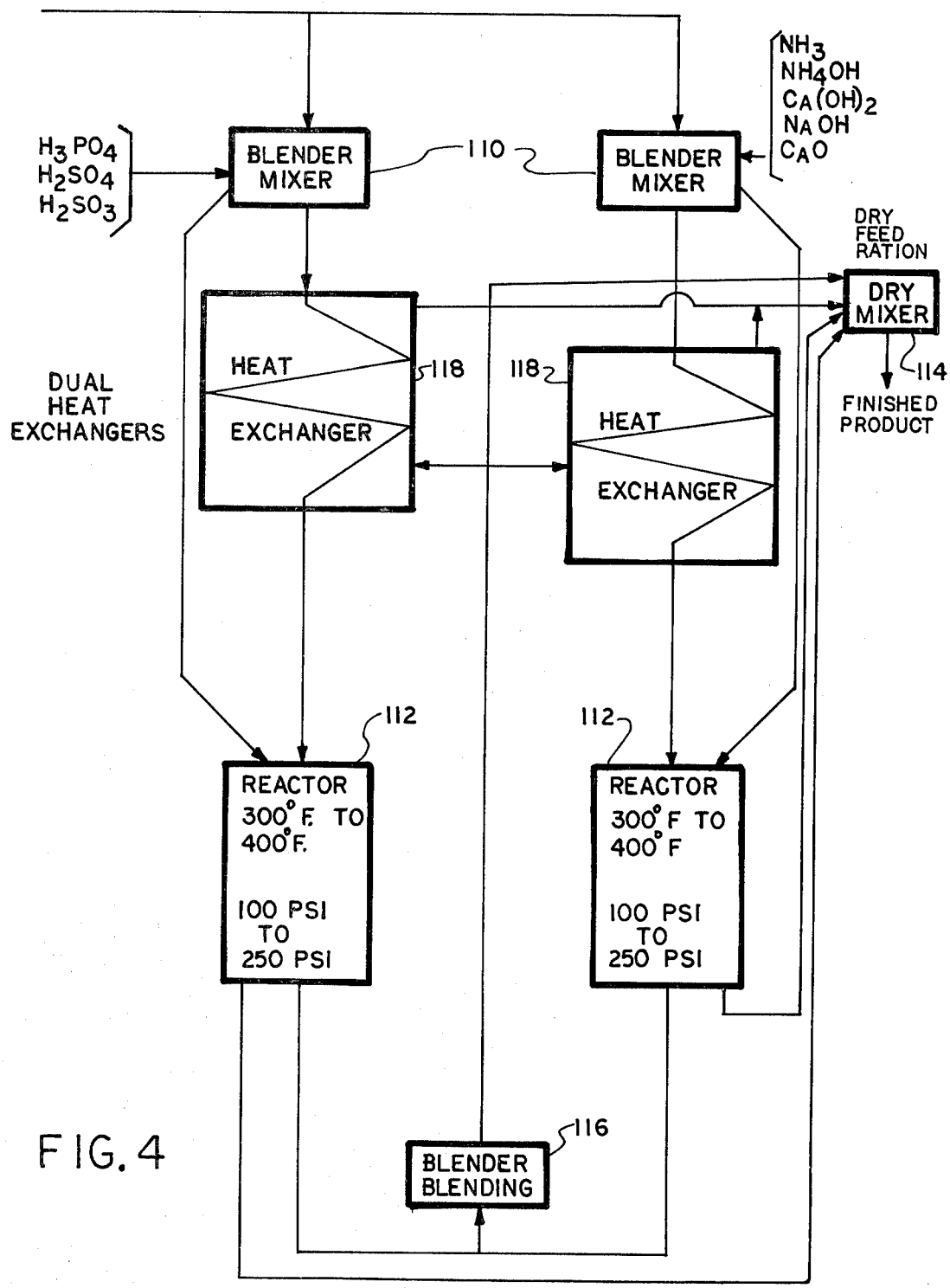

In FIG. 4, there is a schematic illustration of apparatus for subjecting the manure to an elevated temperature and pressure.

For ease of illustration, there is illustrated two blenders 110. The blenders 110 mix the manure 14 with a suitable additive, such as acid 18, i.e., phosphoric acid, sulfuric acid, or sulfurous acid, at process step 16; or with a suitable additive, such as ammonia or ammonium hydroxide 28, ammonia and an alkali metal, or ammonia and an alkali metal and an alkaline earth metal 38, or with an alkali metal or an alkaline earth metal 48 at process step 26, or 36 or 46 to form the mixtures 20 or 30 or 40 or 50.

The mixture 20 or 30 or 40 or 50 can be introduced directly into reactor 112, see process step 22, to subject the mixture to a temperature in the range of about 250° F. to about 400° F. and a pressure in the range of about 30 pounds per square inch to about 250 pounds per square inch for approximately 30 minutes to 60 minutes.

The resulting product 24, or 34, or 44 or 54 can be mixed directly in a dry mixture 114 to form a secondary feed 68 or a tertiary feed 74 or a quaternary feed 80. The resulting feed will be dependent upon the material mixed with the product from the advanced temperature and pressure.

As an alternative to mixing the product 24 or 34 or 44 or 54 with another feed, it is possible to select and mix the products at step 90, FIG. 3, together in a blender 116. Then, the product 92 can be mixed in dry mixer 114 with a suitable primary feed 10 to form a finished product 98 or 104 or 110 to feed the bovine animal or bos 12.

A further alternative is to introduce the mixture 20 or 30 or 40 or 50 into a heat exchanger 118 so as to absorb heat from the product 24 or 34 or 44 or 54 or 92, which product has also been introduced to the heat exchanger, to increase the heat energy of temperature of the mixture 20 or 30 or 40 or 50 before introducing it into the reactor and thereby lessen the cost of heating the mixture. Also, the product 24 or 34 or 44 of 54 or 90 can be cooled making it possible to more directly introduce the product to the dry mixture 114 and mixing with a suitable primary feed 10.

In the reactor 112, there may be introduced, alone, or in combination with the manure, or in combination with the manure and an appropriate additive, other cellulose based material, such as wood chips, sawdist, straw, paper, corrugated board and cardboard, to name a few of the cellulose based materials. As previously stated, the additives will react with the cellulose based material to degrade the cellulose fibers into fibers of shorter length and which can be more readily digested by the bovine animal or bos 12. It is conceivable that the mixture of manure and cellulose base materials at this elevated pressure and temperature will degrade the cellulose fibers to a shorter chain link for ease of digestibility by the bos 12 or bovine animal 12.

Figure 5:
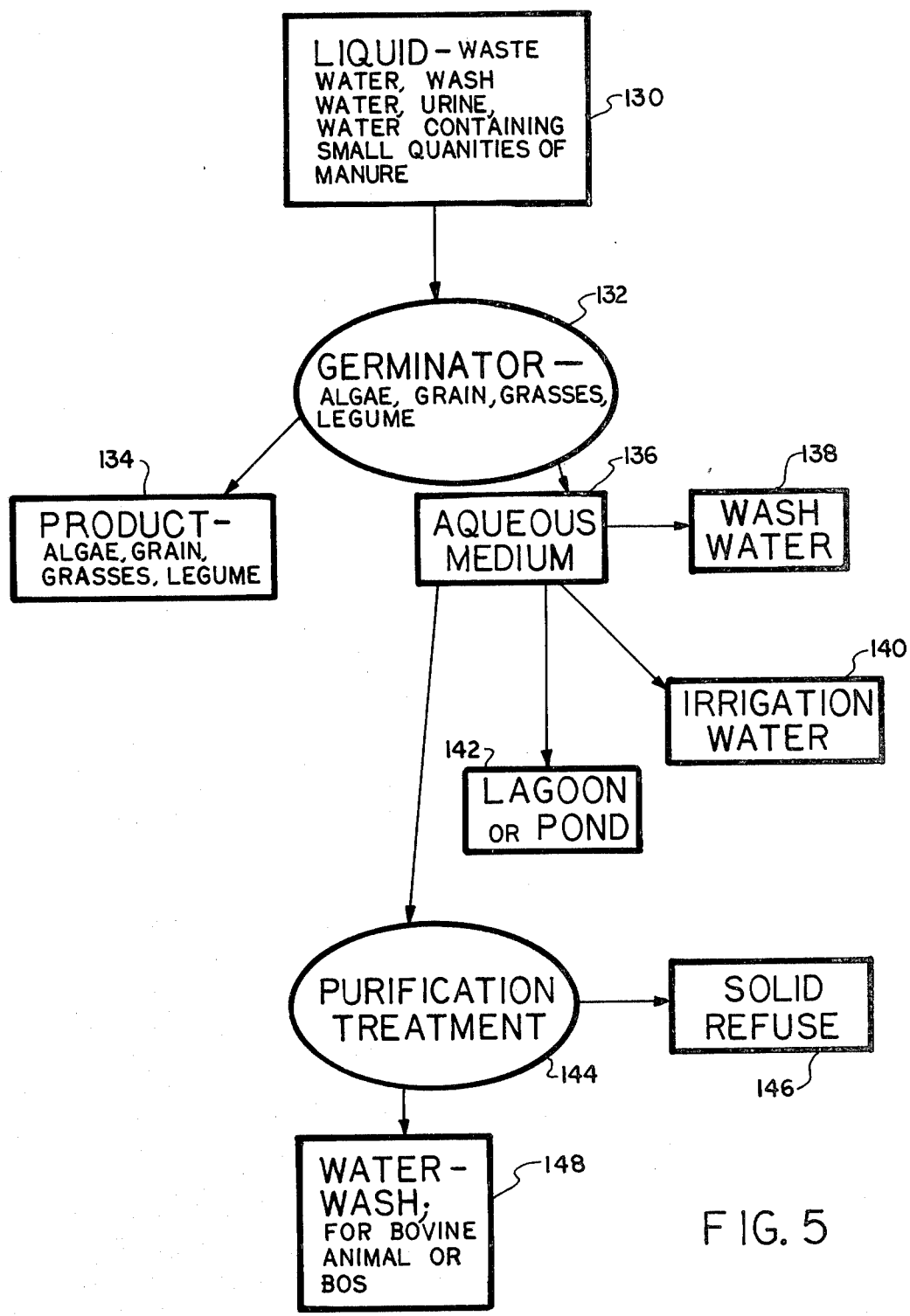

In addition to a solid or semi-solid refuse or waste material, such as manure, there is also produced liquids 130, see FIG. 5, and which liquid may be waste water, wash water, urine, and water containing small quantities of manure. The liquid is also a pollutant or a contaminant and must be treated so as to lessen the contamination and pollution. There have been numerous ways for treating a liquid, such as liquid 130. Some of these ways have been to spray onto a field for use as irrigation water and also as fertilizing water or as a fertilizer. Another way has been to allow the liquid 130 to run into a stream or a river or a lake and cause contamination or pollution. Another way of handling such liquid 130 is to put in a lagoon or pond and let the bacteria in the lagoon or pond react with the materials 130 to get rid of substantially all of the solids. Also, in certain areas and at certain times of the year the liquid will evaporate.

In FIG. 5 it is seen that there is a modification for the treatment of the liquid 130. This modification comprises using the liquid 130 in a hydroponic bath to provide nutrients to grow certain plant feeds which may be used for feeding the bovine animal or bos 12. For example, it is possible to grow algae, certain grains, grasses, and legumes in the process step 132. The growth time is, relatively, short. For example, in a period of 5 days to two weeks, it is possible to grow the algae or grain of grasses or legumes to a state where it can be fed to the bovine animal or bos 12. In the process step 132, the temperature may be maintained at a desirable temperature of 65° F. to 85° F. The plant should grow rapidly at this temperature and with nutrients provided by liquid 130. It may be necessary, at times, to add certain nutrients to make sure that the plants have the proper nutrients. A grain which may, readily, be grown is barley. The barley can be grown at the process step 132 and after approximately 10 days or two weeks, it can be harvested for the bovine animal or bos 12. After the plant has been germinated at process step 132, the product 134 may be separated and also the aqueous medium 136 may be separated. The aqueous medium 136 is more pure than the liquid 130 as many of the contaminants have been removed by the growth of the plant under hydroponic conditions. The aqueous medium 136 may be used as a wash water 138 or may be used as irrigation water 140 and sprinkled onto a field. The soil is capable of handling and treating the aqueous medium 136 and can use some of the nutrients in this medium. Or, the aqueous medium 136 may be introduced to a lagoon or pond 142 for further processing steps. Again, some of the liquids in the aqueous medium 136 in the lagoon or pond 142 may be evaporated at appropriate times of the year.

Plants suitable for feed to a bos 12 have been grown in seven days at a temperature in the range of about 65° F., to, approximately, 85° F. The growing of plants suitable for feed removes some of the waste water. In effect, some of the waste water is processed into the plant and the plant fed to the livestock. This is one way that the water is recycled.

Another processing step for the aqueous medium 136 is the purification step 144. The purification step 144 can take many forms. One form is to allow the solids to settle and decant the supernatant liquid or to treat the aqueous liquid 136 with settling agent such as alum (ammonium sulfate and ferric sulfate, polyelectrolytes, or chitosan), or the aqueous medium 136 may be passed through a filter bed to remove the solids. Another form of treatment is to treat the aqueous medium 136 with a sterilization agent, such as chlorine or oxygen, or a hypochlorite and the like. Another form is to separate the solids 146 and to treat the supernatant liquid or the remaining liquid with a sterilization agent. The resulting water 148 is substantially pure water. It is questionable if a human being would want to drink this water, but it is possible to use this water as wash water or as drinking water for a bovine animal or bos 12. Also, the water 148 can be used for irrigation purposes.

Another treatment step for the waste water, even after the raising of plant food by hydroponic means, is to introduce the waste water into lagoons for further processing such as evaporation of some of the water from the lagoon; for bacteria to work on the chemicals in the aqueous mixture of the lagoon; and, for oxidation of the organic chemicals in the aqueous mixture.

The product 134 may be used as a primary feed 10 for feeding to a bovine animal or bos 12. Also, it is possible to introduce and mix the product 134 with manure 14 and then subject it to an elevated temperature and pressure. Or, the product 134 can be mixed with manure 14 and also mixed with an additive 18, 28, 38 or 48 and subjected to an elevated temperature in the range of about 250° F. to 400° F. and an elevated pressure of about 30 pounds per square inch to about 250 pounds per square inch to form a product. Another way is to mix a product 24, 34, 44, 54 or 92 with a primary feed 10, see FIGS. 2 and 3, to form a tertiary feed, or mix with a product 24, 34, 44, 54 or 92 and a manure to form a quaternary feed 110. These feeds can be fed to the bovine animal or bos 12.

From FIG. 5 it is seen that the nutrients in the liquid 130, said liquid being essentially a waste product and also a potential pollutant or contaminant, can be utilized to form a feed which can be fed to a bovine animal or bos 12. The aqueous medium 136 from the hydroponic processing step 132 is more pure than the liquid 130 and can be more readily disposed than the liquid 130.

The main body of this teaching has used as an illustrative animal a bos or a bovine animal such as a cow or a bull. It is to be realized that this teaching is applicable to livestock in general and to fowl in general. For example, the livestock may be a bos or bovine animal, sheep, pigs and horses and the fowl may be chickens, turkey, pheasant and pigeons. The manure from the livestock such as a bos, sheep, pigs and horses and the manure from fowl such as chickens, turkey, pheasant and pigeons can be treated with an acid or a base-like ammonia or an alkali metal or an alkaline earth metal or a combination of ammonia and an alkali metal and an alkaline earth metal as illustrated by the flow sheet of FIG. 1.

The manure 14 can be mixed with an acid such as an acid containing a sulfite radical or a sulfate radical or a phosphate radical and then subjected to the advanced temperature and pressure to produce product No. 1. Similarly, the manure 14 can be mixed with ammonia and the mixture subjected to advanced temperature and pressure to produce product No. 2. Also, the manure can be mixed with ammonia and a basic metal such as an alkali metal or an alkaline earth metal and the mixture subjected to an advance temperature and pressure to produce product No. 3. As previously taught, the manure can be mixed with an alkali metal or an alkaline earth metal and the mixture subjected to advance temperature and pressure to produce product No. 4. The temperature can be in the range of about 250° F. to approximately 400° F. and the pressure can vary from about 35 pounds per square inch to about 250 pounds per square inch as previously stated.

Then, see FIG. 2, the product of the respective product can be mixed with manure at step 66 to form a secondary feed which can be fed to the livestock or fowl. Or, the product can be mixed with the primary feed at step 72 to form a tertiary feed 74 which can be fed to the livestock and fowl. Additionally, the product can be mixed with primary feed 70 and manure 14 at step 78 to produce a quaternary feed 80 which can be fed to the livestock and fowl.

The collection of the manure and droppings is an important step. In feedlots with cattle, the manure and droppings can be readily collected. Also, with respect to feedlots for sheep and in large concentrations of pigs, the manure and droppings can be readily collected. In certain instances, with fowl, the droppings can be readily collected. For example, chickens, turkeys and pheasants can be raised in cages and the droppings collected below so as to be processed with an acid or a base at an elevated temperature and pressure to form a product which can be mixed with manure or the primary feed, as desired, to form a feed for the livestock and fowl.

The apparatus as illustrated in Block diagram in FIG. 4 can be used to treat and process the manure from the livestock and fowl to form a product. The apparatus of FIG. 4 has previously been described with respect to manure and which manure can be used in a generic sense for livestock such as a bos, sheep, pigs and horses and for fowl such as chickens, turkeys, pheasant and pigeons.

Further, the steps illustrated in FIG. 5 for the hydroponic treating of liquids to form plant products which can be fed to the livestock and fowl is also satisfactory. For example, the liquids from the livestock and fowl can be treated as illustrated in FIG. 5 and as previously described in the textual material to produce the plants. These plants can be algae, grain, grasses and legumes. Most of these plants are suitable for feeding to livestock and fowl. Especially, these plants are suitable for feeding to a bos, sheep, pigs and horses. Further, chickens, turkeys, pheasants and pigeons can also eat many of these products.

Although the main body of the application has been with respect to a bos or a bovine animal the reader is to bear in mind that the process is equally applicable for other livestock such as sheep, pigs and horses and also fowl such as chickens, turkey, pheasants and pigeons.

A modification of the foregoing processes is to mix the droppings of a chicken or a fowl, and which droppings are high in ammonia, with the manure from a bos or a sheep or a pig to form a mixture of manure or droppings and then subject this mixture to the advanced temperature and pressure in the range of approximately 250° F. to about 400° F., and a pressure in the range of about 35 pounds per square inch to about 250 pounds per square inch to form a product. Then, this product can be mixed with manure at Step 66 to form a secondary feeding which can be fed to the livestock or fowl. Or, the product can be mixed with the primary feed at Step 72 to form a tertiary feed 74 which can be fed to the livestock or fowl. Additionally, the product can be mixed with primary feed 70 and manure 14 at step 78 to produce a quaternary feed 80 which can be fed to the livestock and fowl. The chicken droppings, and the droppings from fowl, are high in ammonia content. Therefore, instead of having to purchase ammonia from an outside source it is possible to mix the droppings from fowl with the manure from a bos or sheep or pigs. The source of ammonia is built directly into the droppings from the chicken and fowl.

It is also to be realized that the product from the manure, subjected to the advanced temperature and pressure, can be mixed with urea to form a feed high in the content of urea. Also, the product of the manure, which manure has been subjected to the advanced temperature and pressure, can be mixed with manure and grain and fed to the livestock and fowl as a feed with a high nitrogen content. The addition of the grain increases the ability of the bacteria, in a bos, to produce amino acids in the presence of urea. The body can use the amino acids.

From the foregoing description of our process and apparatus and the invention, what we claim is:

1. A process for making a feed for livestock and fowl, said process comprising:
    a. subjecting manure and an additive selected from the group consisting of an acid, a base, a compound comprising an alkali metal and a compound comprising an alkaline earth metal, to an elevated temperature and an elevated pressure for a suitable period of time to allow the manure and the additive to react to form a product;
  b. said temperature being in the range of about 250° F. to approximately 400° F.;
  c. said pressure being in the range of about 30 pounds per square inch to, approximately, 250 pounds per square inch; and,
  d. said product being said feed for said livestock and fowl.

2. A process according to claim 1, said process comprising:
  a. mixing said product with manure to form a secondary feed; and,
  b. said secondary feed being a feed for said bos.

3. A process according to claim 1, said process comprising:
  a. mixing said product with a primary feed to form a tertiary feed; and,
  b. said tertiary feed being a feed for said livestock and fowl.

4. A process according to claim 1, said process comprising:
  a. mixing said product with manure and a primary feed to form a quaternary feed; and,
  b. said quaternary feed being a feed for said livestock and fowl.

5. A process according to claim 1, said process comprising:
  a. said base being selected from the group consisting of ammonia, a compound comprising an alkali metal and a compound comprising an alkaline earth metal.

6. A process according to claim 1, said process comprising:
  a. said base comprising ammonia, a compound comprising an alkali metal and a compound comprising an alkaline earth metal.

7. A process according to claim 1, said process comprising:
  a. said base comprising ammonia; and,
  b. said product being referred to as an ammonia product.

8. A process according to claim 7, said process comprising:
  a. mixing said ammonia product with manure to form a secondary feed; and,
  b. said secondary feed being a feed for said livestock and fowl.

9. A process according to claim 7, said process comprising:
  a. mixing said ammonia product with a primary feed to form a tertiary feed; and,
  b. said quaternary feed being a feed for said livestock and fowl.

10. A process according to claim 7, said process comprising:
  a. mixing said ammonia product with manure and a primary feed to form a quaternary feed; and,
  b. said quaternary feed being a feed for said livestock and fowl.

11. A process according to claim 1, said process comprising:
  a. mixing a plurality of said products with manure to form a secondary feed; and,
  b. said secondary feed being a feed for said livestock and fowl.

12. A process according to claim 1, said process comprising:
  a. mixing a plurality of said products with a viscosity builder to increase the viscosity of said product to form an increased viscosity product;
  b. mixing said increased viscosity product with manure to form a secondary feed; and,
  c. said secondary feed being a feed for said livestock and fowl.

13. A process according to claim 1, said process comprising:
  a. mixing a plurality of said products with a primary feed to form a tertiary feed; and,
  b. said tertiary feed being a feed for said livestock and fowl.

14. A process according to claim 1, said process comprising:
  a. mixing a plurality of said products with a viscosity builder to increase the viscosity of said product to form an increased viscosity product;
  b. mixing said increased viscosity product with a primary feed to form a tertiary feed; and,
  c. said tertiary feed being a feed for said livestock and fowl.

15. A process according to claim 1, said process comprising:
  a. mixing a plurality of said product with manure and a primary feed to form a quaternary feed; and,
  b. said quaternary feed being a feed for said livestock and fowl.

16. A process according to claim 1, said process comprising:
  a. mixing a plurality of said products with a viscosity builder to increase the viscosity of said product to form an increased viscosity product;
  b. mixing said increased viscosity product with manure and a primary feed to form a quaternary feed; and,
  c. said quaternary feed being a feed for said livestock and fowl.

17. A process according to claim 1, said process comprising:
  a. adding said product to an aqueous mixture to form an aqueous feed.

18. A process according to claim 17, said process comprising:
  a. said aqueous feed comprising vitamins and minerals.

19. A process according to claim 17, said process comprising:
  a. said aqueous feed comprising molasses, vitamins and minerals.

20. A feed for livestock and fowl prepared by the process according to claim 1.

21. A feed for livestock and fowl comprising the product prepared by the process according to claim 1 and adding said product to an aqueous mixture to form an aqueous feed.

* * * * *